July 2, 1963    K. SCHMIDLAPP    3,096,034
METHOD AND APPARATUS FOR PURIFYING POTASSIUM
SALT-CONTAINING MATERIALS
Filed Dec. 28, 1960
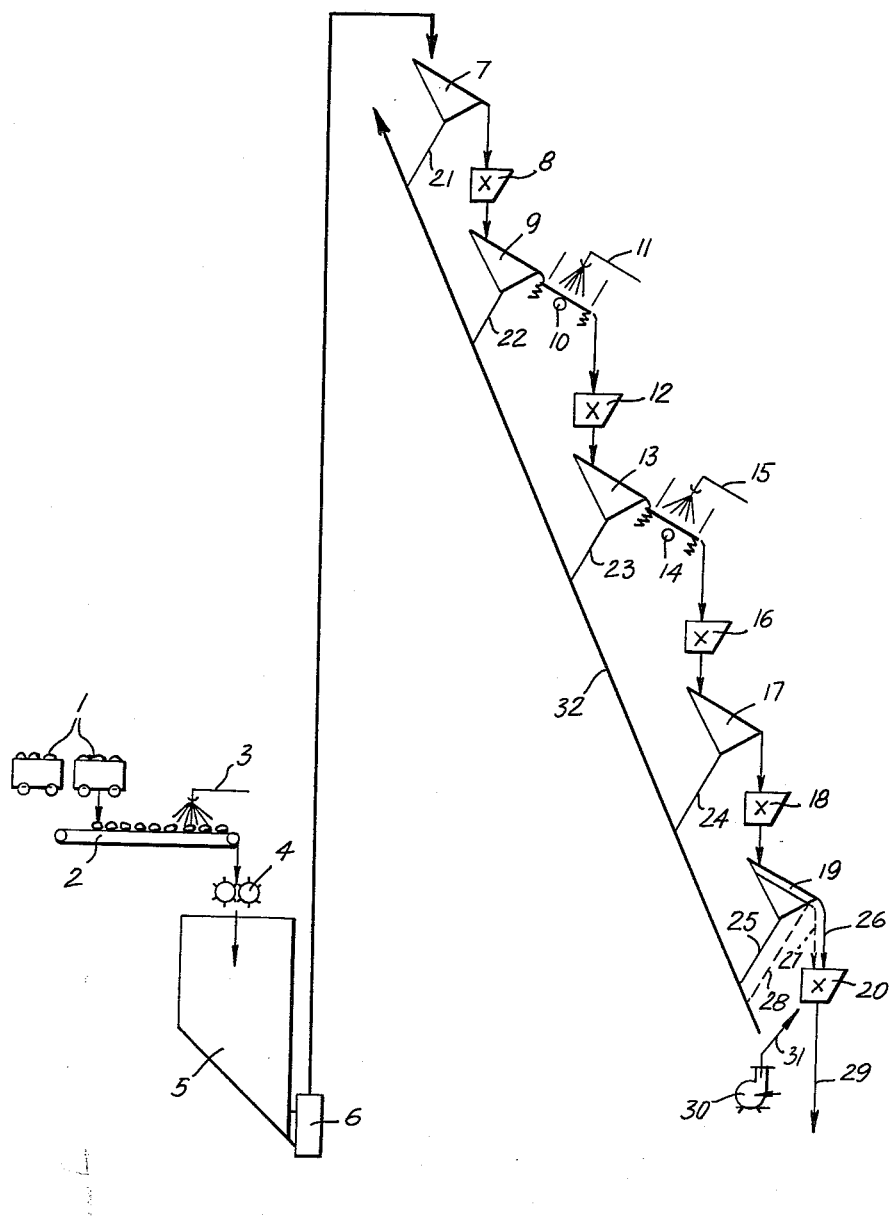
INVENTOR.
Kurt Schmidlapp
BY
Michael S. Striker
Attorney

United States Patent Office 3,096,034
Patented July 2, 1963

3,096,034
METHOD AND APPARATUS FOR PURIFYING POTASSIUM SALT-CONTAINING MATERIALS
Kurt Schmidlapp, Neuhof, Kreis Fulda, Germany, assignor to Wintershall Aktiengesellschaft, Kassel, Germany
Filed Dec. 28, 1960, Ser. No. 79,073
16 Claims. (Cl. 241—14)

The present invention relates to the working up of potassium salts-containing raw material and particularly to the separation of sludge-forming clay constituents from the crude potassium salts or potassium salts containing raw materials so as to facilitate the further processing of the material.

Natural potassium salt deposits contain clay-like and other water insoluble accompanying materials all of which will be referred to herein as clay constituents. These water insoluble and sludge-forming clay constituents cause great difficulties in the working up of the potassium salts, for instance by flotation processes. Clay constituents of sylvitic hard salt deposits may amount to about 2% of the weight thereof and the amount of clay constituents in other sylvitic raw materials may exceed 10%.

These sludge-forming impurities cause considerable difficulties during formation of hot potassium salt solutions. The hot solution is contaminated with finely subdivided sludge-forming insoluble particles which tend to remain in suspension and frequently can be caused to thicken and to form a sediment only with the assistance of auxiliary precipitating agents. Nevertheless, frequently it is extremely difficult to free the hot solution from sludge particles remaining in suspension and this will result upon cooling of the hot potassium solution in the recovery of finely granulated low-purity end products.

In addition, even when it is possible adequately to separate the sludge from the major portion of the hot solution further difficulties arise in the separation of the sludge cake from the adhering residual salt solution. The sludge may contain bentonite and may display thixotropic tendencies. Thus, potassium containing solution will be bound by the sludge cake and losses of potassium will be incurred due to the unsatisfactory separation of solution from the sludge cake.

Separation by flotation is also unfavorably influenced by sludge-forming constituents of the raw material, since sludge particles will be retained in the concentrate fractions and will reduce the purity thereof. Furthermore, the finely subdivided sludge particles impair the effectiveness of flotation improving agents. In addition, the presence of the finely subdivided sludge particles will stabilize and prevent easy destruction of the foam formed on the liquid leaving the flotation process. Thus, an excess of sludge-forming particles will not only render the flotation process uneconomical but, in fact, will make it impossible to carry out such process.

In order to overcome the above-described and very serious difficulties in the recovery of potassium salts from raw materials including sludge-forming constituents, attempts have been made to separate the sludge-forming constituents of the raw material from the potassium containing remainder thereof prior to flotation or hot dissolution of the potassium containing fraction. Thus, it has been attempted to separate coarse clay particles by hand from the crushed raw material. According to a rather expensive method, the dry comminuted material is subjected to electrostatic separation. The wet methods of clay separation are modified flotation processes with sludge thickening devices such as counter current wash-thickeners, whereby large quantities of waste waters are produced which it is sometimes difficult to dispose of. Various other modifications of dry and wet clay separation have been proposed all of which, however, are quite involved, and uneconomical, and at best only of limited effectiveness. Thus, frequently one has to resort to the old method of manually separating the larger clay particles from the crushed raw material and to attempt in this manner to keep during subsequent working up of the potassium salts the content of clay constituents at a manageable low level. It may be noted that in order to be effective, the separation of clay or sludge-forming constituents should be carried out to such an extent that no more than 1.5% by weight, and preferably less, of the sludge-forming constituents remain in the potassium salt-containing fraction.

It is therefore an object of the present invention to overcome the above-discussed difficulties in the separation of sludge-forming constituents from the main body of potassium salts-containing raw materials.

It is another object of the present invention to provide a simple and economical method for the effective separation of sludge-forming constituents such as clay from the potassium salts-containing portion of raw materials, for instance sylvitic minerals. Other objects and advantages of the present invention will become apparent from a further reading of the description and of the appended claims.

With the above and other objects in view, the present invention contemplates in a method of separating sludge-forming constituents from crude potassium salt containing the same, the steps of subjecting the sludge-forming constituents containing crude potassium salt to a series of successive impact comminutions at varying impact velocities, with the impact velocity of the first and last impact comminution steps being smaller than the impact velocity of the intermediate impact comminution.

Surprisingly, it has been found that according to the present invention the content of sludge-forming constituents of the crude potassium salt containing material can be reduced down to about 1.5% or even lower by continuously passing the raw material through a series of successively arranged impact comminutors operating at predetermined rotational speeds, whereby the material is sifted or screened while passing from one impact comminutor to the next. It has been found that in each of these impact comminutions the material will be broken down into clay or the like particles of relatively large size and potassium salt-containing particles of relatively smaller size so that the clay particles can be separated from the potassium salt containing particles by screening prior to subjecting the thus separated larger clay-containing particles to the next impact comminution.

The present invention requires certain relationships between the rotational speeds of the individual impact comminutors through which the material passes. The rotational speed increases from the first to the second step and is then reduced again in subsequent impact comminution steps, as will be more fully described below.

By comminuting the raw material in a hammer mill, it will not be possible to form the fractions of considerably increased or reduced clay content. For instance, by subjecting the crude potassium salt containing 2.5% insoluble constituents to comminution in a conventional hammer mill having a rotational speed of 29 meters per second at its peripheral beater portion, the material may be comminuted into particles of varying sizes ranging up to 4 mm.

Upon separation of the thus comminuted material into various size ranges, the following percentage of clay was found in the respective particle sizes:

TABLE I

| Particle size, mm.: | Clay in percent by weight |
|---|---|
| 1–4 | 2.10 |
| 0.75–1 | 11.73 |
| 0.6–0.75 | 12.24 |
| 0.5–0.6 | 10.91 |
| 0.4–0.5 | 9.46 |
| 0.3–0.4 | 12.67 |
| 0.2–0.3 | 8.44 |
| 0.1–0.2 | 10.19 |
| 0.6–0.1 | 10.99 |
| 0.06 | 12.27 |

Obviously, the above-described process is not suitable for effectively reducing the clay content of the crude potassium salt. In contrast thereto sequentially arranged impact comminutors, preferably at least 3, and most preferably 4, impact comminutors with sifting of the material while it passes from one impact comminutor to the next and with a definite relationship between the rotational speeds of the individual impact comminutors, will result in a selective breakdown of the material into larger predominantly clay containing particles and smaller potassium salt enriched particles.

Thus, according to the present invention, it is possible to comminute the raw material for instance to a maximum particle size of 4 mm. while at the same time carrying out an effective clay separation with small, economically feasible loss of potassium salt. The process of the present invention will result in a product containing not more than about 1.5% and preferably only about 1.2% of insoluble constituents, which product is eminently suitable for further purification by flotation or the like.

Surprisingly, it has been found that the somewhat plastic clay constituents will offer more resistance to comminution in an impact comminutor than the potassium salt constituents of the raw material. This is particularly so when the impact velocity is relatively low. Thus, it is possible to separate the sludge-forming clay constituents to a considerable extent in dry form from the more brittle salt and to enrich the clay content of certain particle sizes while the clay content of other particle sizes is reduced.

For instance, by subjecting a raw material having a maximum particle size of 40 mm. and containing 2.5% insolubles to impact comminution in an impact breaker such as disclosed in U.S. Patent 2,889,119 to Andreas, at an impact velocity of 24 m./sec., it will be found that the clay content of the various size fractions will be as follows:

TABLE II

| Particle size, mm.: | Clay in percent by weight |
|---|---|
| Up to 4 | 20.52 |
| 1–4 | 39.34 |
| 0.75–1 | 10.50 |
| 0.5–0.6 | 6.70 |
| 0.4–0.5 | 7.13 |
| 0.3–0.4 | 6.28 |
| 0.2–0.3 | 5.13 |
| 0.1–0.2 | 2.19 |
| 0.06–0.1 | 1.31 |
| 0.06 | 0.90 |
|  | 100.00 |

Thus, it can be seen that the clay content of the larger particles will increase while the smaller particles will show a reduced content of sludge-forming clay constituents. If the mixture resulting from such impact comminution is now classified by size, for instance by screening, it will be possible to separate the larger particles of increased clay content from the smaller particles of reduced clay content. By repeating this process at suitably arranged impact comminution velocities, it will be possible to obtain on the one hand clay particles which contain only a very small percentage of potassium salt and on the other hand potassium salt enriched particles which contain only very little clay.

It is important to note that, as shown in Table IIA, when impact comminution for instance with the Andreas impact breaker shown in U.S. Patent No. 2,889,119 is carried out at considerably higher impact velocities for instance at a circumferential velocity of the impact comminutor of 60 meters per second, that under such conditions maximum concentration will be shifted to a relatively smaller particle size such as between 0.4 and 0.75 mm. so that it is not possible thereafter to separate the clay enriched particles from the remainder in an economical manner. It is therefore important according to the present invention to so adjust the circumferential speed or velocity of the impact comminutor that with reducing particle size of the material which is fed into the impact comminutor the further comminution will still result in larger particles of increased clay content and smaller particles of reduced clay content. For instance, the impact velocity during the second comminution may be greater than during the first comminution, while in subsequent comminution steps the impact velocity may again be reduced in order to achieve the desired result.

TABLE IIA

| Impact velocity, m./sec.: | Percent[1] |
|---|---|
| 15 | 88 |
| 25 | 70 |
| 30 | 38 |
| 40 | 3 |
| 60 | 0.5 |

[1] Percent clay content of larger particles (greater than 3 mm.).

The dependency of the loss of potassium salt on the impact velocity is shown in Table III with one raw material, by way of example:

TABLE III

| Impact veloctiy, m./sec.: | $K_2O$ percent[1] |
|---|---|
| 15 | 0.85 |
| 20 | 0.61 |
| 25 | 0.51 |
| 30 | 0.43 |
| 35 | 0.35 |
| 40 | 0.29 |

[1] Percent lost with clay enriched fraction.

For best separation of the raw material used according to Table III, the selective comminution of the same and separation of the clay constituents from the residue will be carried out in four impact comminution steps at impact velocities as indicated in Table IV:

TABLE IV

|  | Impact velocity m./sec. | Preferred m./sec. |
|---|---|---|
| First impact comminution | 17–27 | 18–22 |
| Second impact comminution | 26–38 | 30–36 |
| Third impact comminution | 20–30 | 22–26 |
| Fourth impact comminution | 20–30 | 22–26 |

Considering the upper limit of the preferred range of impact velocity for the first impact comminution and the lower limit of the preferred range of impact velocity for the second impact comminution, it will be apparent that preferably the impact velocity of the second impact comminution will be at least about 35% greater than the impact velocity during the first impact comminution.

Most of the clay will be found in the coarse fractions of 0.5 mm. or larger particle size and it is possible in this manner to remove without difficulty for instance up to 60% of the initial clay content of the raw material.

This surprising result can be further improved by spraying or wetting with finely subdivided polar or non-polar liquids, for instance water or salt solutions, or by treating the material for a short period of time with warm air of 100% relative humidity. As polar liquids, aliphatic and aromatic alcohols, esters, ketones, ether and mixtures thereof may be used, and as non-polar liquids, for instance non-polar liquid hydrocarbons, such as benzene, or carbon tetrachloride. Apparently, by such treatment a surface impregnation of the clay constituents takes place without appreciable softening of the clay and in this manner the plastic qualities of the clay are increased compared with the potassium salt-containing mineral constituent which remains brittle. Consequently, upon subjecting the thus wetted raw material to impact comminution there will be an even more effective separation into somewhat plastic clay particles and brittle potassium salt enriched particles.

It was then found that lesser quantities of liquid will be needed for the above purpose when the liquid is applied in vapor form than when liquid is sprayed directly on to the material.

Table V illustrates a result obtained by application of 0.3% water in the form of a spray or in the form of saturated steam:

TABLE V

| Particle size, mm. | Untreated, percent insoluble | Sprayed with 3% water, percent insoluble | Steamed with saturated steam, percent insoluble |
|---|---|---|---|
| 3 | 66.6 | 68.5 | 82.4 |
| 1.5–3 | 10.6 | 10.3 | 6.1 |
| 1–1.5, 0.75–1 | 5.6 | 6.1 | 3.8 |
| 0.5–0.75 | 4.0 | 2.9 | 1.9 |
| 0.3–0.5 | 3.0 | 2.9 | 1.5 |
| 0.1–0.3 | 4.2 | 4.5 | 2.0 |
| 0.1 | 6.0 | 4.8 | 2.3 |

Table V shows the remarkably favorable clay enrichment in the coarse fraction of the wetted clay containing potassium salt mineral and the better separation accomplished in this manner. It is interesting to note that the clay content of the coarse fraction of above 3 mm. will increase only by 1.9% upon spraying with water, however, by steaming the increase will amount to 15.8%. Spraying took five minutes while steaming was completed in three seconds, which, of course, further increases the advantages of steaming over spraying.

It is also possible and sometimes advantageous to carry out the first surface treatment, be it by steaming or spraying, below ground for instance during tilting and emptying of the miner's wagon, whereby this thus introduced moisture will bind simultaneously undesirable dust.

Of course, the wetting must not be carried out beyond the introduction of a certain upper percentage of moisture. This maximum percentage is in the neighborhood of about 0.5% of the weight of the treated material, above which the plasticity of the clay is increased beyond desirable limits and makes it difficult to separate the same from the potassium salt increased fraction during the subsequent screening process.

A further increase in the selective separation effect can be accomplished by the incorporation of a polar wetting agent, for instance a fatty acid amine in the aqueous wetting liquid.

After the first impact comminution step, the oversize clay enriched particles will be retained on the screen while the smaller particles of reduced clay content will pass through the same. After subsequent impact comminution, screening is carried out in similar manner, whereby the clay enriched overflow particles are wetted by spraying or steaming in order to increase the selectivity of the subsequent impact comminution step.

It has been found to be advantageous to insert at the terminal portion of the sieve or screen a blind bottom to carry out wetting while the material passes over this terminal portion. However, screening and wetting may also be carried out in separate devices, by passing the particles after screening over a vibrating table or the like and to spray or steam the material while it is intensively moved during passage across the vibrating table. It is desirable to closely control the amount of liquid which is imparted to the material and this is more easily accomplished by steaming.

After completion of the last impact comminution step, preferably the fourth impact comminution, the clay enriched fraction is withdrawn from the process while the potassium salt enriched smaller particles of the individual impact comminution steps are collected for further processing.

Comparison experiments which were carried out with the same raw material by hand separation and by selective impact comminution according to the present invention at the rate of 250 tons per hour gave the results shown in Table VI:

TABLE VI

| | Clay separation by— | |
|---|---|---|
| | Manual separation | Selective impact comminution [1] |
| Separated clay mineral, t/h | 3 | 3.15 |
| Insolubles in clay mineral, percent | 13.1 | 34.1 |
| Clay removal (on clay mineral), percent | 16.14 | 45 |
| Residual clay in potassium salt fraction, percent insoluble | 1.2 | 0.91 |
| $K_2O$ loss in separated clay, percent | 0.29 | 0.33 |

[1] According to the present invention.

As shown above, the fully automatic selective impact comminuation according to the present invention will achieve a lesser residual clay content in the crude potassium salt than can be achieved by manual separation, while, for all practical purposes, the loss of $K_2O$ in the clay fraction is the same in both cases. Furthermore, and this is most important, manual separation of 250 tons per hour requires about 35 workers which, of course, are not needed by proceeding in accordance with the present invention.

The effect of the present invention on subsequent salt flotation is shown in Table VII which clearly indicates a better $K_2O$ yield at higher concentration and with lesser requirements of flotation agents than by manual separation of clay constituents:

TABLE VII

| Method of clay separation | Amount of flotation agent, g./t. | Concentration, percent $K_2O$ | Yield, percent $K_2O$ |
|---|---|---|---|
| No separation crude salt containing 1.85% water insolubles corresponding to 2.5% clay substance | 75 | 57.3 | 84.6 |
| Manual separation crude salt containing 1.31% water insolubles corresponding to 1.6% clay substance | 40 | 58.3 | 90.2 |
| Repeated impact comminution (four times) crude salt containing 0.84% water insolubles corresponding to 0.9% clay substance | 32 | 59.0 | 91.6 |

The clay enriched residue of the last impact comminution is removed and may be used for instance as backfilling. However, at least a portion thereof may also be used for granulating potassium salts. In the latter case separation of the clay constituents may be carried out selectively by varying the rotational speed of the impact comminutors, since in this case it is not necessary to control and carefully limit the $K_2O$ losses in the clay fraction which subsequently is used for granulating potassium salts.

If the clay enriched residue of the process of the present invention is to be further processed into a fertilizer, together with other constituents, then the clay fraction may be further comminuted by additional impact comminution of the same at higher rotational speeds, preferably between 25 and 70 meters per second, whereby it is advantageous during such further comminution of the clay fraction to heat the impact comminutor with hot air. Further processing may be carried out for instance in accordance with the method described in German Patent No. 1,022,241.

The impact comminution of the raw material or of the larger particle fraction resulting from the preceding impact comminution is carried out in an impact crusher or breaker per se known in the art, one type of such impact breaker is for instance described in U.S. Patent No. 2,889,119 to Andreas.

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawing, in which the FIGURE shows a schematic illustration of a preferred arrangement according to the present invention.

Referring now to the drawing, it is schematically shown that the broken raw material as mined is conveyed underground in haulage vehicles 1 to conveyor 3 and passes from conveyor 3 through crusher 4 into underground hopper 5. The first wetting of the raw material is preferably carried out during passage of the raw material from haulage vehicles 1 to crusher 4, for instance by means of a spraying device associated with conveyor 3. The crushed wetted and well mixed raw material is stored in hopper 5 and hauled from there above ground by means of haulage device 6.

The material now enters the crude salt comminution installation and passes over screen 7 for separation into fines and into material of above about 4 mm. particle size. The thus separated fines, as well as the subsequently separated fines fractions are collected on elevator 32. The overflow from screen 7 is comminuted in first impact comminutor 8 at relatively low circumferential speed. The crushed material leaving impact comminutor 8 passes over screen 9 where it is separated in fines which reach elevator 32 via chute 22, and into coarse material (the overflow of screen 9) which passes to and is wetted on vibrating table 10. Wetting may be carried out by spraying or steaming as described further above. The wetted material is then introduced into the next or second impact comminutor 12 and here again broken into a fraction of fines consisting essentially of potassium salt and into a coarse fraction of enriched clay or insolubles content. From impact comminutor 12, the material passes to screen 13, the fines are separated and reach elevator 32 via chute 23, and the coarse fraction passes to vibrating table 14 and is again wetted, for instance by means such as a nozzle device 15. The thus wetted material passes to the third impact comminutor 16. Here again, the material is broken down into fines and a coarse fraction and the fines are screened out on screen 17 and guided to elevator 32 via chute 24. It is essential according to the present invention that the circumferential velocity of impact comminutor 12, i.e., the second impact comminutor of the series starting with impact comminutor 8, is higher than the circumferential velocity of impact comminutor 8, while the circumferential speed of the third impact comminutor 16 preferably is less than that of impact comminutor 12. The coarse fraction of the broken mixture produced in impact comminutor 16, i.e., the overflow of screen 17, is then introduced into the fourth impact comminutor 18 and passes from there to screen 19. Contrary to screens 10 and 14, screen 19 is not coordinated with a wetting device. However, it may be noted that the specific arrangement of wetting devices, i.e., the number of wetting devices and the location of the same, depends to some extent on the particular raw material and on the degree of comminution achieved in the individual impact comminutors.

Screen 19 is provided with two screening surfaces so that the material reaching screen 19 from impact comminutor 18 will be divided into three fractions of which the fines will pass via chute 25 to elevator 32, while the intermediate fraction may optionally pass via chute 28 to elevator 32 or via chute 27 to the last impact comminutor 20. The coarse fraction, i.e., the overflow from the upper screen 19, will then pass via chute 26 to impact comminutor 20.

The material which reaches impact comminutor 20 is high in clay content and includes only a very small portion of the original potassium salt. Thus, the material which is passed through comminutor 20 serves no longer for the recovery of potassium salt therefrom. It is further comminuted in comminutor 20, preferably until at least 85% of the material reaches a fineness of 1.5 mm. or below and during comminution in impact comminutor 20, hot air is introduced via blower 30 and conduit 31, since the residual moisture of the material would otherwise prevent fine crushing of the same.

It is thus apparent that the relationship between the rotational speeds, i.e., the impact velocities to which the material is exposed in the series of impact comminutors, is of major importance in order to achieve the nearly complete separation of potassium salt from the sludge-forming insoluble or clay constituents of the raw material. The process of the present invention is generally carried out at ambient temperatures.

It has been found that best results according to the present invention are achieved by arranging for separation of clay and salt between three and four impact comminutors, preferably the four impact comminutors indicated in the drawing reference numerals 8, 12, 16 and 18, so that the rotational speed of the second impact comminutor is higher than the rotational speed of the first impact comminutor, and the rotational speed of the third and fourth impact comminutors is lower than the rotational speed (or impact velocity) of the second impact comminutor. At least two impact comminutors must be used according to the present invention, in which case the rotational speed of the second impact comminutor will be greater than that of the first impact comminutor and, for all practical purposes, the maximum number of impact comminutors for sequential comminution of the raw material with separation into coarse clay enriched particles and smaller potassium salt enriched particles, will not exceed eight.

Wetting agents which may be advantageously sprayed or steamed on to the material include saturated steam under relatively low over pressure, or aqueous salt solutions containing, for instance, between 150 and 250 grams per liter of magnesium chloride, or, the so-called hard salt solution which accrues in the potassium salt recovery and which contains about 80 grams per liter of potassium chloride, 100 grams per liter of sodium chloride, 150 grams per liter of magnesium chloride and 50 grams per liter of magnesium sulfate may also be advantageously used for wetting the material prior to further impact comminution.

The following example is given as illustrative only of the present invention however, without limiting the same to the specific details of the example.

*Example*

The material as mined is broken and wetted and is then conveyed to screen 7. 250 tons per hour of such material containing 1.4% insoluble which equals 1.80% clay mineral are thus introduced. This material has the following particle sizes:

TABLE VIII

| | Percent |
|---|---|
| 40–160 mm. | 18.1 |
| 4–40 | 24.7 |
| 1–4 | 15.8 |
| 0.6–1 | 11.4 |
| 0.3–0.6 | 15.0 |
| 0.2–0.3 | 4.2 |
| 0–0.3 | 10.8 |
| | 100.0 |

About 150 tons per hour of the material pass through screen 7 and are removed by conveyor 21. These 150 tons per hour have a particle size of less than 4 mm. 100 tons per hour with a particle size which is generally at least 4 mm. and contains only very little of smaller particles pass then into impact comminutor 8 and are therein selectively broken down under conditions such that substantially no clay agglomerations are formed. The material from comminutor 8 passes on to screen 9 where again the portion having a particle size of less than 4 mm. is passing through the screen and is removed by conveyor 22. The material which does not pass through screen 9 is then wetted as previously described in connection with the drawing. This process is repeated several times for instance as illustrated in the drawing, whereby the degree of separation on each screen depends of course on the mesh width thereof. The finer the mesh width, the purer is the potassium salt material which is separated, however, the greater is the amount of potassium which remains with the coarse overflow. Consequently, when the potassium containing overflow can be utilized for other purposes, then it is generally desirable to use a screen of lesser mesh width in order to obtain a fine product of higher purity. However, when it is desirable to obtain the largest possible yield calculated as potassium oxide in the fine product then, of course, a somewhat wider mesh will be used for the screening of the respective comminuted material. In any event, the clay concentration in the coarse material which does not pass through the respective screens will be enriched so that for instance if the material which reaches screen 7 contains 1.8% of clay mineral, then the coarse material or overflow from screen 7 will show a clay concentration of 3.6%, the overflow from screen 9 a clay concentration of 7.6%, the overflow from screen 13 a clay concentration of 20.5%, the overflow from screen 17 a clay concentration of 35% and the overflow from screen 19, i.e., the two overflows which are indicated by reference numerals 26 and 27 will show a clay concentration of 58.0% while overflow 26 taken alone will have a clay concentration of 63.0%. Under the given conditions, about 1.7 tons per hour of comminuted potassium fine salt will pass through double screen 19 to conveyor 25. The separated clay is contained in the overflows 26 and 27, whereby overflow 27 may be added to the crude salt and reintroduced into the screening process if desired.

Under the given conditions, for instance 3.5 tons per hour of clay enriched material will accrue in overflows 26 and 27. The analysis of the combined overflows 26 and 27 show about 34.1% insoluble substances which correspond to about 58% of clay substance.

Table IX gives the screen analysis of the coarse overflow 26.

TABLE IX

| | Percent |
|---|---|
| 4 mm. | 73.8 |
| 3–4 | 22.1 |
| 1–3 | 2.5 |
| 1–1.5 | 0.6 |
| 0.5–1 | 0.6 |
| 0–0.5 | 0.4 |
| | 100.0 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of separating sludge-forming clay constituents from a particulate sludge-forming clay and potassium salt containing mined raw material, the steps of subjecting particulate sludge-forming clay and potassium salt-containing mined raw material including also particles within the size range of between 40 and 160 mm. without prior impact comminution to impact comminution at a first predetermined impact velocity so as to separate said raw material into clay enriched larger particles and potassium salt enriched smaller particles; recovering said potassium salt enriched particles from the thus formed particulate mixture; subjecting said clay enriched larger particles to impact comminution at a second velocity being greater than said first impact velocity so as to separate said clay enriched particles into further potassium salt enriched smaller particles and larger clay enriched particles; recovering said further potassium salt enriched particles; and subjecting the thus separated clay enriched particles to impact comminution at a third impact velocity being smaller than said second impact velocity so as to cause further separation into clay enriched larger particles and smaller potassium salt containing particles of greatly reduced clay content.

2. In a method of separating sludge-forming clay constituents from a particulate sludge-forming clay and potassium salt containing mined raw material, the steps of subjecting particulate sludge-forming clay and potassium salt-containing mined raw material including also particles within the size range of between 40 and 160 mm. without prior impact comminution to impact comminution at a first predetermined impact velocity of between 17 and 27 m./sec. so as to separate said raw material into clay enriched larger particles and potassium salt enriched smaller particles; recovering said potassium salt enriched particles from the thus formed particulate mixture; subjecting said larger clay enriched particles to impact comminution at a second impact velocity of between 26 and 38 m./sec. being greater than said first impact velocity so as to separate said clay enriched particles into further potassium salt enriched smaller particles and larger clay enriched particles; separating said further enriched particles; subjecting said clay enriched particles to impact comminution at a third impact velocity of between 20 and 30 m./sec. being smaller than said second impact velocity so as to cause further separation into clay enriched larger particles and smaller potassium salt containing particles of greatly reduced clay content, and recovering the thus formed potassium salt containing particles of greatly reduced clay content.

3. In a method of separating sludge-forming clay constituents from a particulate mined raw material containing a potassium salt and sludge-forming clay constituents, the steps of subjecting particulate sludge-forming clay and potassium salt-containing mined raw material including also particles in the size range of between 40 and 160 mm. without prior impact comminution to impact comminution at a first predetermined impact velocity so as to form of said raw material a mixture of clay enriched larger particles and potassium salt enriched smaller particles; screening the thus-formed mixture so as to separate the same into said smaller and larger particles; subjecting the thus separated clay enriched larger particles to impact comminution at a second velocity being greater than said first impact velocity so as to form a second mixture of clay enriched larger particles and of potassium salt enriched smaller particles; screening the thus formed second mixture so as to separate the same into said last formed smaller and larger particles; subjecting the thus last formed separated clay enriched larger particles to impact comminution at a third impact velocity being smaller than said second impact velocity so as to form a further mixture of clay enriched larger particles and potassium salt enriched smaller particles; screening the thus formed further mixture so as to separate the same into said further formed smaller potassium salt enriched particles and clay enriched larger particles; and recovering said separated potassium salt enriched smaller particles formed in said several impact comminution steps.

4. In a method of separating sludge-forming clay constituents from a particulate mined raw material containing a potassium salt and sludge-forming clay constituents, the steps of subjecting particulate sludge-forming clay and potassium salt-containing mined raw material including also particles in the size range of between 40 and 160 mm. without prior impact comminution to a first impact comminution at a first predetermined impact velocity so as to form of said raw material a mixture of clay enriched larger particles and potassium salt enriched smaller particles; screening the thus-formed mixture so as to separate the same into said smaller and larger particles; subjecting the thus separated clay enriched larger particles to a second impact comminution at a second velocity being greater than said first impact velocity so as to form a second mixture of clay enriched larger particles and of potassium salt enriched smaller particles; screening after said second impact comminution the mixture of larger and smaller particles formed thereby so as to separate the same into smaller and larger particles; subjecting the thus separated clay enriched larger particles to impact comminution at a third impact velocity being smaller than said second impact velocity so as to form a further mixture of clay enriched larger particles and potassium salt enriched smaller particles; screening the thus formed further mixture so as to separate the same into said further formed smaller potassium salt enriched particles and clay enriched larger particles; and recovering said separated potassium salt enriched smaller particles formed in said several impact comminution steps.

5. A method according to claim 4 wherein prior to the last impact comminution said potassium salt containing particles are treated with low pressure steam so as to form a thin layer of water on said particles.

6. A method according to claim 4, wherein said clay enriched particles obtained by impact comminution at said third velocity, after separation from the potassium salt enriched fraction, are subjected to at least one further impact comminution at an impact velocity of between 25 and 70 m./sec.

7. A method according to claim 6, wherein during said further impact comminution of said clay enriched particles the same are contacted with hot air so as to dry said particles.

8. A method according to claim 4 wherein the material to be treated is wetted at least once after the first and before the last impact comminution.

9. A method according to claim 4 wherein a wetting agent is applied to the material to be treated at least once after the first and before the last impact comminution.

10. A method according to claim 4 wherein a liquid is applied to the surface of the separated clay enriched larger particles formed in the last of said second impact comminutions prior to subjecting said particles to impact comminution at said third impact velocity; and wherein said liquid is applied in a quantity equal to about 0.5% of the weight of said larger particles.

11. In a device for separating sludge-forming clay constituents from a particulate mined raw material comprising crude potassium salts and sludge-forming clay constituents, in combination, a first impact crusher of the type which has a rotor which throws material against an impact member of the crusher, said first impact crusher including means for rotating said rotor thereof at a predetermined speed for crushing said particulate raw material into a relatively coarse clay enriched fraction and into a relatively fine potassium salt enriched fraction; feed means for feeding said particulate raw material to said first impact crusher; a second impact crusher of the same type as and operatively connected to said first impact crusher, said second impact crusher including means for rotating the rotor of said second crusher at a speed greater than said predetermined speed for further crushing said relatively coarse clay enriched fraction into a further clay enriched relatively coarse fraction and a potassium enriched relatively fine fraction; a third impact crusher of the same type as said first impact crusher and operatively connected to said second impact crusher, said third impact crusher including means for rotating the rotor thereof at a speed which is less than the rotational speed of said rotor of said second impact crusher for separating the further clay enriched fraction from said second impact crusher into a relatively fine potassium salt enriched fraction and a relatively coarse clay enriched fraction; screening means operatively associated with each of said impact crushers for separating the relatively coarse from the relatively fine fraction formed in the respective impact crushers; conveying means for passing the thus separated relatively coarse fraction produced in said first and second impact crushers to the second and third impact crushers, respectively; and collecting means for collecting the relatively fine potassium salt enriched fractions produced by said impact crushers.

12. In a device according to claim 11, wetting means operatively associated with at least one of said screening means for wetting at least one of said clay enriched fractions prior to introduction of the same into the subsequent impact crusher.

13. In a device according to claim 12, a last impact crusher of the same type as said first impact crusher, said last impact crusher being adapted to receive the coarse fraction from the screening means associated with said third impact crusher for further comminution of said fraction, said last impact crusher including blower means for contacting said coarse fraction during comminution of the same with hot air.

14. In a method of separating sludge-forming clay constituents from a particulate mined raw material containing a potassium salt and sludge-forming clay constituents, the steps of subjecting particulate sludge-forming clay and potassium salt-containing mined raw material including also particles in the size range of between 40 and 160 mm. without prior impact comminution to impact comminution at a first predetermined impact velocity so as to separate said raw material into clay enriched larger particles and potassium salt enriched smaller particles; recovering said potassium salt enriched smaller particles from the thus formed particulate mixture; subjecting said clay enriched larger particles to impact comminution at a second velocity being at least about 35% greater than said first impact velocity so as to separate said clay enriched particles into further potassium salt enriched smaller particles and larger clay enriched particles; recovering said further potassium salt enriched particles; and subjecting the thus separated clay enriched particles to impact comminution at a third impact velocity being smaller than said second impact velocity by at least about 15%, so as to cause further separation into clay enriched larger particles and smaller potassium salt containing particles of greatly reduced clay content.

15. In a method of separating sludge-forming clay constituents from particulated sylvitic hard salt deposits as a raw material containing a potassium salt and sludge-forming clay constituents, the steps of subjecting particulate sludge-forming clay and potassium salt-containing mined raw material including also particles in the size range of between 40 and 160 mm. without prior impact comminution to impact comminution at a first predetermined impact velocity so as to separate said raw material into clay enriched larger particles and potassium salt enriched smaller particles; recovering said potassium salt enriched smaller particles from the thus formed particulate mixture; subjecting said clay enriched larger particles to impact comminution at a second velocity being at least about 35% greater than said first impact velocity so as to separate said clay enriched particles into further potassium salt enriched smaller particles and larger clay enriched particles; recovering said further potassium salt enriched particles; and subjecting the thus separated clay enriched particles to impact comminution at a third impact velocity being smaller than said second impact velocity by at least about 15%, so as to cause further separation into clay enriched larger particles and smaller potassium salt containing particles of greatly reduced clay content.

16. In a method of separating sludge-forming clay constituents from a particulate mined raw material containing a potassium salt and sludge-forming clay constituents, the steps of wetting particulate sludge-forming clay and potassium salt-containing mined particulate raw material including also particles within the size range of between 40 and 160 mm.; subjecting said wetted raw material without prior impact comminution to a first impact comminution at a first predetermined impact velocity so as to form of said raw material a mixture of clay enriched larger particles and potassium salt enriched smaller particles; screening the thus-formed mixture so as to separate the same into said smaller and larger particles; subjecting the thus separated clay enriched larger particles to a plurality of successive second impact comminutions at second velocities being greater than said first impact velocity so as to form successive mixture of clay enriched larger particles and of potassium salt enriched smaller particles; screening after each of said second impact comminutions the mixture of larger and smaller particles formed in the respective second impact comminution so as to separate the same into smaller and larger particles; subjecting the separated clay enriched larger particles formed in the last of said second impact comminutions to impact comminution at a third impact velocity being smaller than said second impact velocities so as to form a further mixture of clay enriched larger particles and potassium salt enriched smaller particles; screening the thus formed further mixture so as to separate the same into said further formed smaller potassium salt enriched particles and clay enriched larger particles; and recovering said separated potassium salt enriched smaller particles formed in said several impact comminution steps.

References Cited in the file of this patent

UNITED STATES PATENTS

| | | |
|---|---|---|
| 139,782 | Goodhart | June 10, 1873 |
| 256,073 | Taggart | Apr. 4, 1882 |
| 368,900 | Ryerson | Aug. 23, 1887 |
| 1,147,211 | Coleman et al. | July 20, 1915 |
| 2,023,247 | Senseman | Dec. 3, 1935 |
| 2,464,212 | Carter | Mar. 15, 1949 |
| 2,609,150 | Bludeau | Sept. 2, 1952 |
| 2,789,772 | Williamsen | Apr. 23, 1957 |
| 2,826,370 | Weston | Mar. 11, 1958 |
| 2,889,119 | Andreas | June 2, 1959 |

FOREIGN PATENTS

| | | |
|---|---|---|
| 20,115 | Great Britain | of 1913 |
| 76,400 | Germany | July 27, 1894 |
| 697,309 | Germany | Oct. 10, 1940 |

OTHER REFERENCES

Dana's Manual of Mineralogy, fourteenth edition, pp. 180, 186 and 323.

Handbook of Chemistry, by Lange, ninth edition, pp. 1101 and 1102.